US006272554B1

(12) United States Patent
Chang et al.

(10) Patent No.: US 6,272,554 B1
(45) Date of Patent: *Aug. 7, 2001

(54) METHOD AND APPARATUS FOR A CORBA TYPECODE DATA MANIPULATOR

(75) Inventors: David Yu Chang, Austin; Scott Robert Hinkelman, Georgetown, both of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/762,908

(22) Filed: Dec. 10, 1996

(51) Int. Cl.[7] .......................................................... G06F 9/54
(52) U.S. Cl. .............................................................. 709/313
(58) Field of Search .............................. 395/200.61, 683, 395/876; 341/82, 55, 56, 60, 95; 709/314, 315, 329

(56) References Cited

U.S. PATENT DOCUMENTS

| | | | |
|---|---|---|---|
| 3,772,654 | * 11/1973 | Evans et al. ............................. | 341/60 |
| 5,664,103 | * 9/1997 | Stein et al. ............................. | 709/205 |
| 5,784,698 | * 7/1998 | Brady et al. ............................ | 711/171 |
| 5,797,007 | * 8/1998 | Erickson et al. ...................... | 712/300 |
| 5,864,866 | * 1/1999 | Henckel et al. ...................... | 707/103 |

OTHER PUBLICATIONS

McGraw–Hill Dictionary of Scientific and Technical Terms, fifth edition; pp. 278, 279, and 770, Dec. 1994.*
IBM Corporation & SunSoft, Inc.; Object Externalization Service; OMG TC Document 94–5–7; pp. 1–21, May 1994.*
Orfali et al., "The Essential Distributed Objects Survival Guide", Wiley, pp. 93–107, 139–164, Sep. 1995.*
OMG Document No. 91.12.1, "The Common Object Request Broker: Architecture and Specification", Digital Equipment Corporation et al., pp. 105–121, Dec. 1991.*

* cited by examiner

Primary Examiner—Alvin Oberley
Assistant Examiner—Gary Scott Fourson
(74) Attorney, Agent, or Firm—David A. Mims, Jr.

(57) ABSTRACT

A method and apparatus for decomposing arbitrarily complex CORBA data types into a flat data buffer and recomposing the data type back from the buffer. CORBA TypeCode data is converted to/from stream form. A memory management function releases the memory used for the reconstructed form of the TypeCode data. An encoder interface routine receives inputted CORBA data. A two pass procedure is executed which allocates buffers and passes ownership information for the inputted CORBA data which is converted into a contiguous representation.

15 Claims, 12 Drawing Sheets

METHOD AND APPARATUS FOR A CORBA TYPECODE DATA MANIPULATOR

FIELD OF THE INVENTION

The present invention relates to data processing systems, and more particularly, to expressing arbitrarily complex data in forms appropriate for interfacing with programming interfaces or Input/Output stream form.

BACKGROUND OF THE INVENTION

Object-oriented programming (OOP) has emerged as a powerful new programming paradigm that enables the rapid development and implementation of functionality while permitting the customization and reuse of objects. The Object Management Group (OMG, an international organization for promoting the theory and practice of object-oriented software technology) defines an industry standard architecture for a distributed object computing environment called the Object Management Architecture (OMA). The OMA provides a conceptual infrastructure upon which all of the OMG's specifications are based.

OMG defines a structure to allow integration of a wide variety of object systems called the Common Object Request Broker Architecture (CORBA). The CORBA model consists of the Object Request Broker (ORB), CORBAservices, CORBAfacilities and Application Objects. These components make up the primary pieces of CORBA.

CORBA defines an underlying object model which provides an organized presentation of object concepts and terminology. With the definition of the CORBA object model, along with aspects such as object creation, identity, requests, and operations, is the definition of CORBA Types. CORBA types are identifiable entities to which values can be members, if the type constraints are satisfied. CORBA types are either basic, or constructed. An example of a basic CORBA type is a Boolean, taking values of only TRUE or FALSE. An example of a CORBA constructed type is a sequence, consisting of a variable length array of a single type (basic or constructed), and a length. From the CORBA basic and constructed types, applications can construct arbitrarily complex data types via aggregation (user defined types).

CORBA defines an architected way of describing in complete detail everything that is known about a particular data type, regardless of whether it is a CORBA defined type or a user defined aggregated type, through TypeCodes. TypeCodes conceptually contain a kind field and one or more parameters that contain descriptive information particular to that TypeCode. Utilizing CORBA TypeCodes to express complex data information makes it possible to determine the complete structure of a type. CORBA Type-Codes can be nested and thus represent arbitrarily complex information that has to be manipulated by CORBA applications.

Within distributed object systems, the need arises to express arbitrarily complex data in forms appropriate for interfacing with programming interfaces, or expressing it in stream form. For example, arbitrarily complex data must be provided for transport protocol stacks for computer networking or I/O stream requirements. Since TypeCodes allow interrogation of all information expressed in data types, it is possible to provide procedures for manipulating the data expressed as CORBA TypeCodes both to and from stream forms.

The CORBA marshaling code represents a prior art approach for decomposing CORBA data types into a specific wire-format used to transport information across machines. However, typical marshaling subsystems do not provide mechanisms for releasing and copying allocated memory used to reconstruct the original data types, nor do they make the marshalled data available for public utilization for general purposes. In addition, CORBA marshaling code requires the wire-format marshaled information have indicators of expression for marshaled data elements in order to reconstruct data for the data types appropriate on different platforms.

Consequently, what is needed is a procedure for translating arbitrarily complex CORBA data types for use by CORBA application programs, to and from a general purpose stream format, that is made publicly available to any caller. In addition, the procedure must be capable of freeing memory within arbitrarily complex CORBA data types and making copies of the arbitrarily complex CORBA data types.

SUMMARY OF THE INVENTION

This invention relates to a method and apparatus for decomposing arbitrarily complex CORBA data types into a flat data buffer and recomposing the data type back from the buffer. A procedure is provided which converts CORBA TypeCode data to/from stream form and provides a memory management function to release the memory used for the reconstructed form of the TypeCode data. An encoder interface procedure is provided for receiving inputted CORBA data. A two pass procedure is executed which decomposes the TypeCode data, allocates buffers and passes ownership information for the inputted CORBA data which is converted into a contiguous, in memory, representation.

DETAILED DESCRIPTION OF THE EMBODIMENTS

This invention provides a method and apparatus for translating arbitrarily complex CORBA data types into a "flat" data buffer by an encode procedure, and to recompose the data types back from the data buffer using a decode procedure. The invention also provides memory management routines for releasing the memory obtained during the reconstruction/recomposition of a decomposed CORBA data type. The invention in the form of a TypeCodeDataManipulator (TDM) is contained in the SOMObjects Toolkit manufactured by International Business Machine Corporation. The TDM provides procedures for each CORBA data type (primitive and aggregated as listed in TABLE A), that are capable of representing the CORBA data type in flat, or buffer-oriented formats, and converse routines that reads the buffer data and reconstructs the data into its original form. The invention will be more fully explained with reference to FIGS. 1–11.

Figure 1:
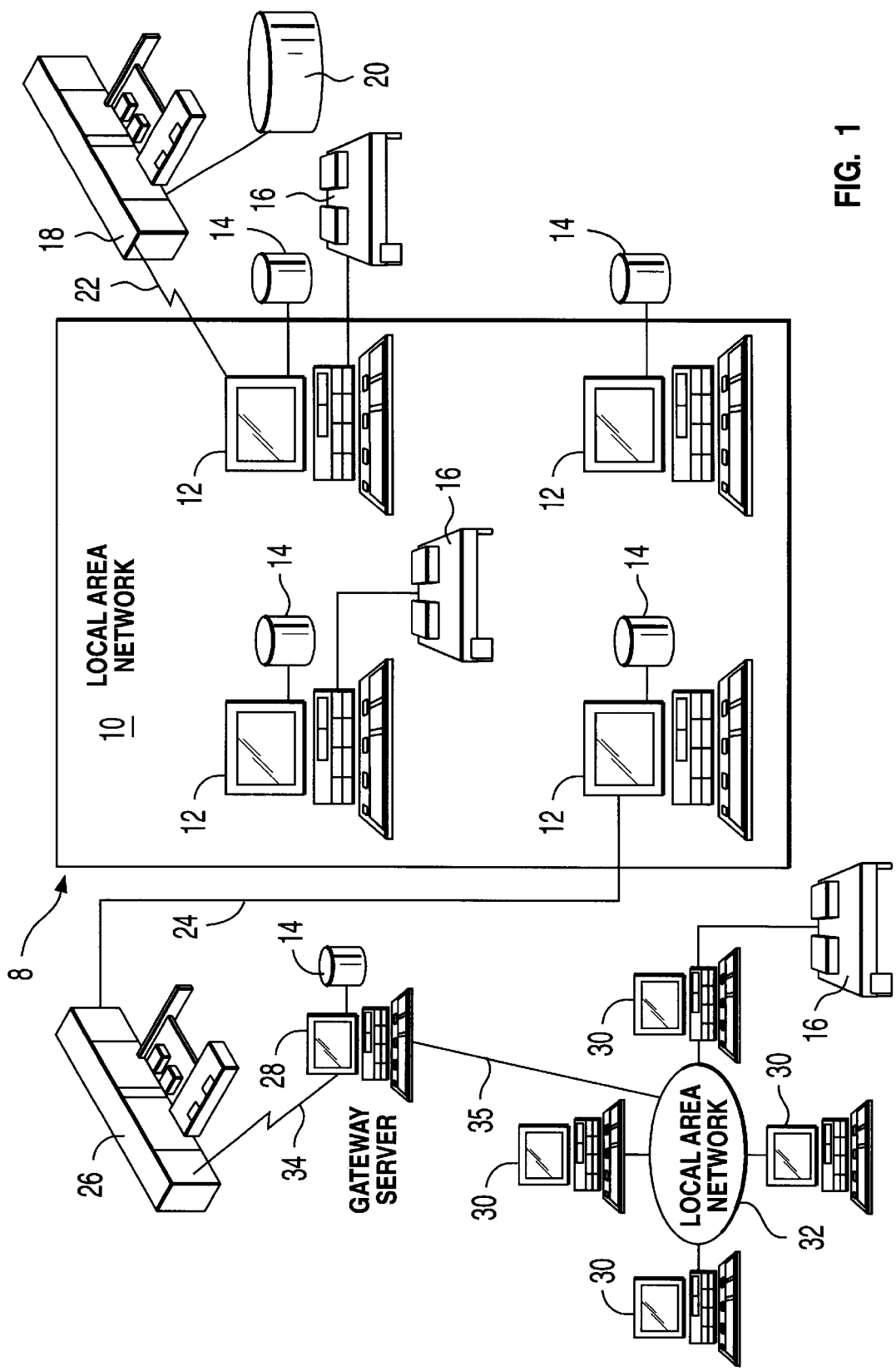
FIG. 1 is an illustrative embodiment of a heterogeneous distributed data processing system in accordance with the present invention.

Referring now to FIG. 1, there is shown a representative hardware environment where this invention may be practiced. FIG. 1 illustrates a pictorial representation of a distributed data processing system 8, which contains a plurality of networks, including local area networks (LAN) 10 and 32, each of which preferably includes a plurality of individual computers 12 and 30, respectively. One skilled in the art will appreciate that a plurality of workstations coupled to a host processor may be utilized for each such network. As is common in such data processing systems, each computer 12 and 30, may be coupled to a storage device 14, and a printer 16.

Data processing system 8 further includes one or more mainframe computers, such as mainframe computer 18, which may be preferably coupled to LAN 10 by means of a communication link 22. Mainframe computer 18 is preferably coupled to a storage device 20, which serves as remote storage for LAN 10. LAN 10 is also coupled via communications link 24 through communications controller 26 and communications link 34 to gateway server 28. Gateway server 28 is preferably a workstation which serves to link LAN 32 to LAN 10 via communications link 35. As understood by one skilled in the art, data processing system 8 additionally includes unillustrated gateways, routers, bridges, and various other network hardware utilized to interconnect the segments of data processing system 8.

Figure 2:
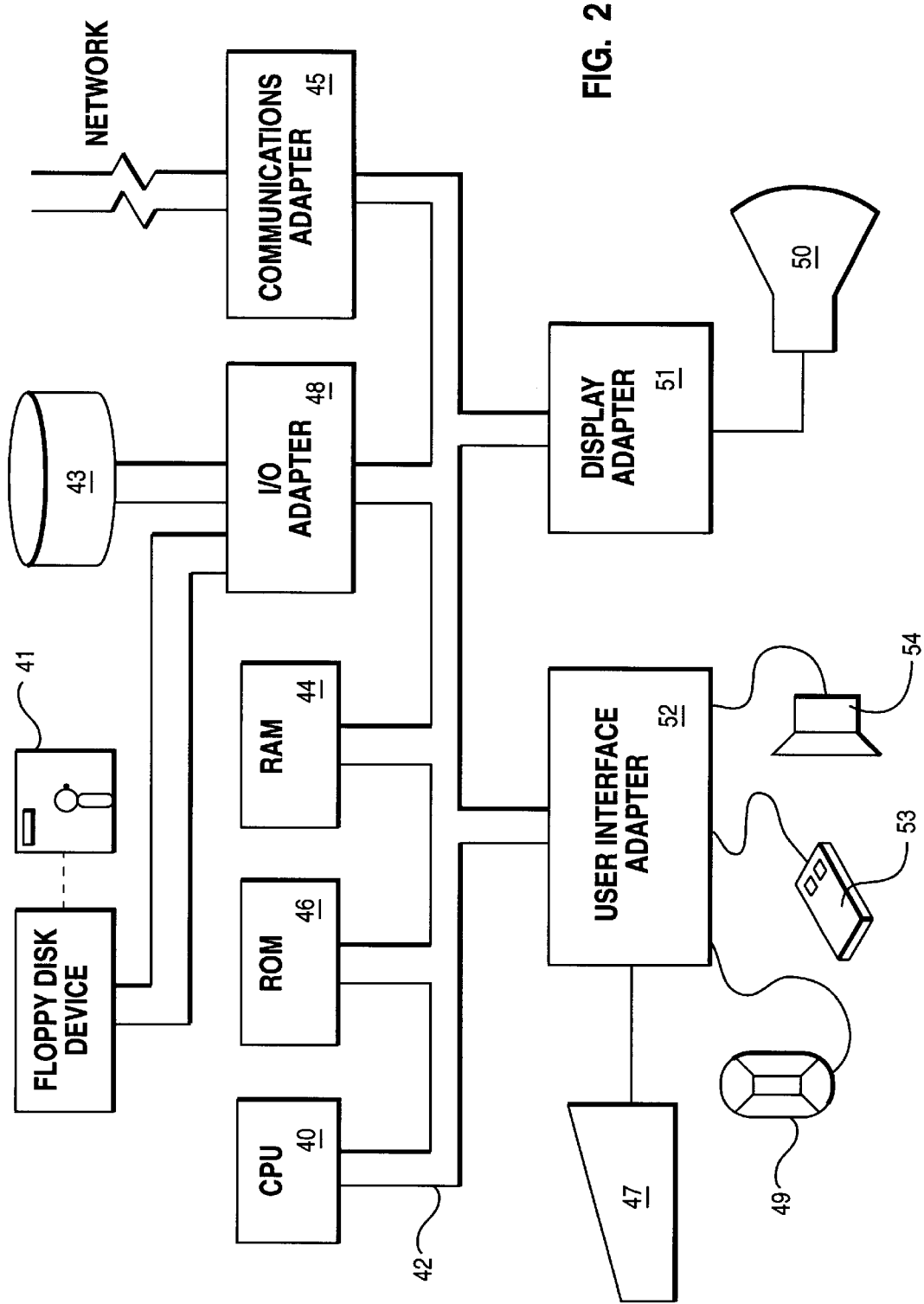
FIG. 2 is a block diagram of a computer/workstation within the distributed data processing system in FIG. 1.

Referring now to FIG. 2, there is shown a pictorial representation of a workstation, having a central processing unit 40, such as a conventional microprocessor, and a number of other units interconnected via a system bus 42. The workstation shown in FIG. 2, includes a Random Access Memory (RAM) 44, Read Only Memory (ROM) 46, an I/O adapter 48 for connecting peripheral devices such as disk unit 43 to the bus, a user interface adapter 52 for connecting a keyboard 47, a mouse 53, a speaker 54, a microphone 49, and/or other user interface devices such as a touch screen device (not shown) to the bus, a communication adapter 45, for connecting the workstation to a data processing network and a display adapter 51, for connecting the bus to a display device 50. The workstation, in the preferred embodiment, has resident thereon the OS/2 operating system and the computer software making up this invention which is included as a Programmer's toolkit. One skilled in the art will appreciate that the procedures of this invention may be in the form of a computer program product on a computer readable medium, which may be temporarily or permanently loaded on the workstation in disk storage 43, floppy diskette 41, or RAM 44.

The TypeCodeDataManipulator (TDM) provides the capability for decomposing arbitrarily complex CORBA data types into a "flat" data buffer using a (tc_encode()) routine, and to recompose the data types back from the data buffer using a (tc_decode()) routine. The TDM also provides memory management routines for releasing the memory it obtained during reconstruction of a decomposed CORBA data type. Fundamentally, the invention converts CORBA TypeCode data to/from stream form and provides the memory management function to release the memory used for the reconstructed TypeCode data. In addition, the invention provides a simple copy function to make copies of CORBA data types.

Figure 3:
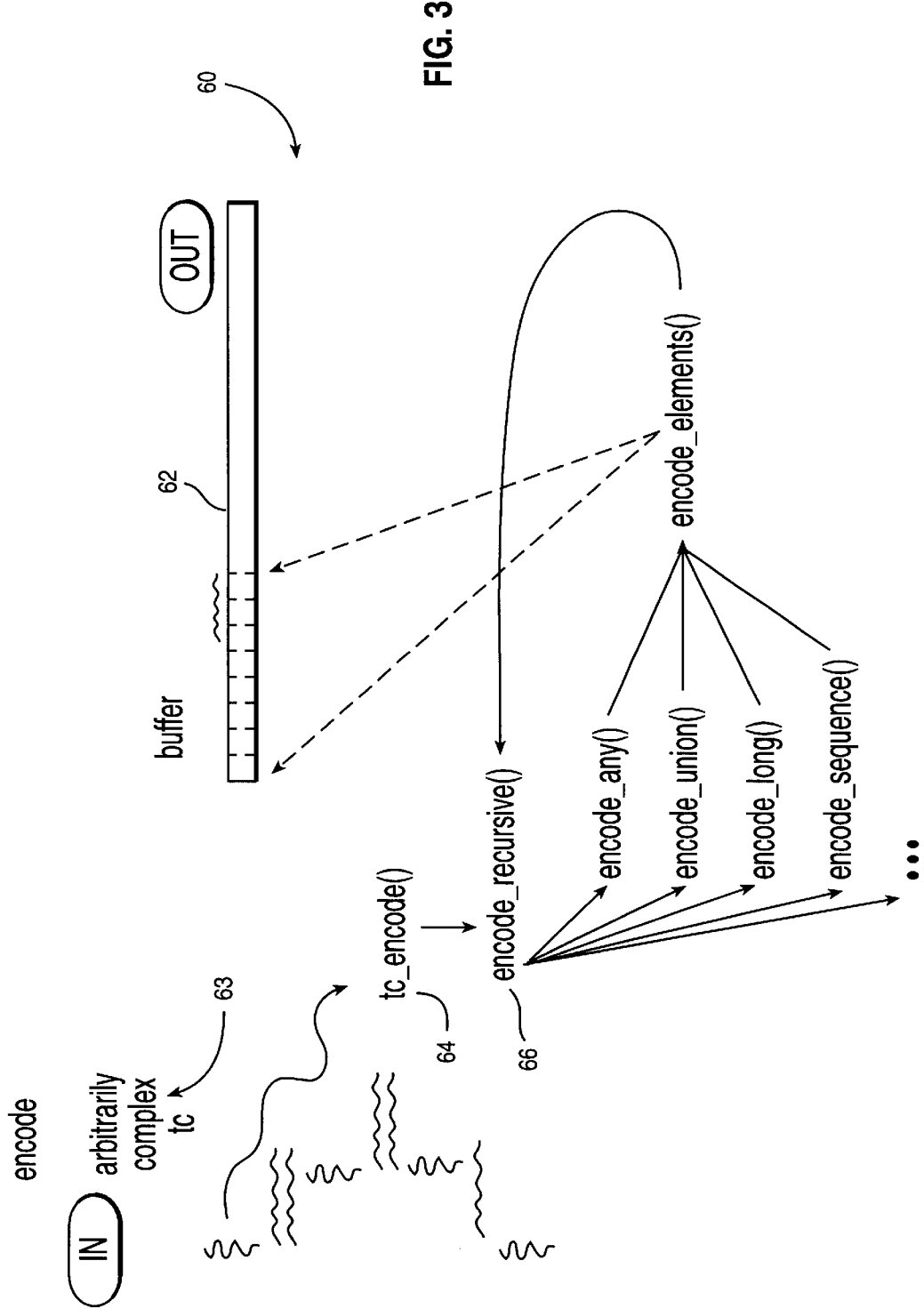
FIG. 3 is a pictorial representation of a TypeCodeData-Manipulator's encoder routine.

Referring now to FIG. 3, there is shown a procedure 60 for a tc_encode() routine 64 which decomposes arbitrarily complex CORBA data types 63 into a flat buffer 62. The TDM allocates the flat buffer 62, and passes ownership to a caller following execution of the decomposition routine, tc_encode() 64. The decomposition routine uses a two pass procedure encode_recursive() 66 that operates over the entire caller supplied data type in the following manner:

Pass 1

Recursively examine each TypeCode element, starting with the initially provided CORBA TypeCode element, keeping a running total size requirement for expressing the element in a flat buffer (Since the TDM operates on CORBA Types, everything can be determined about each type, including its size, and unique identifier).

Allocate the required total memory.

Pass 2

Recursively process each TypeCode element, starting with the initially provided CORBA TypeCode element, into a converted contiguous representation. The actual data, length information, and type information are sequentially installed into the allocated buffer.

The buffer 62 and ownership is passed to the caller. The generated buffer is then opaque to the caller and contains all of the original constructed data and all required information needed to recompose the original construct. A length of the generated buffer is returned, and must be utilized to recompose the data type from the buffer, since the buffer may contain nulls.

Figure 4:
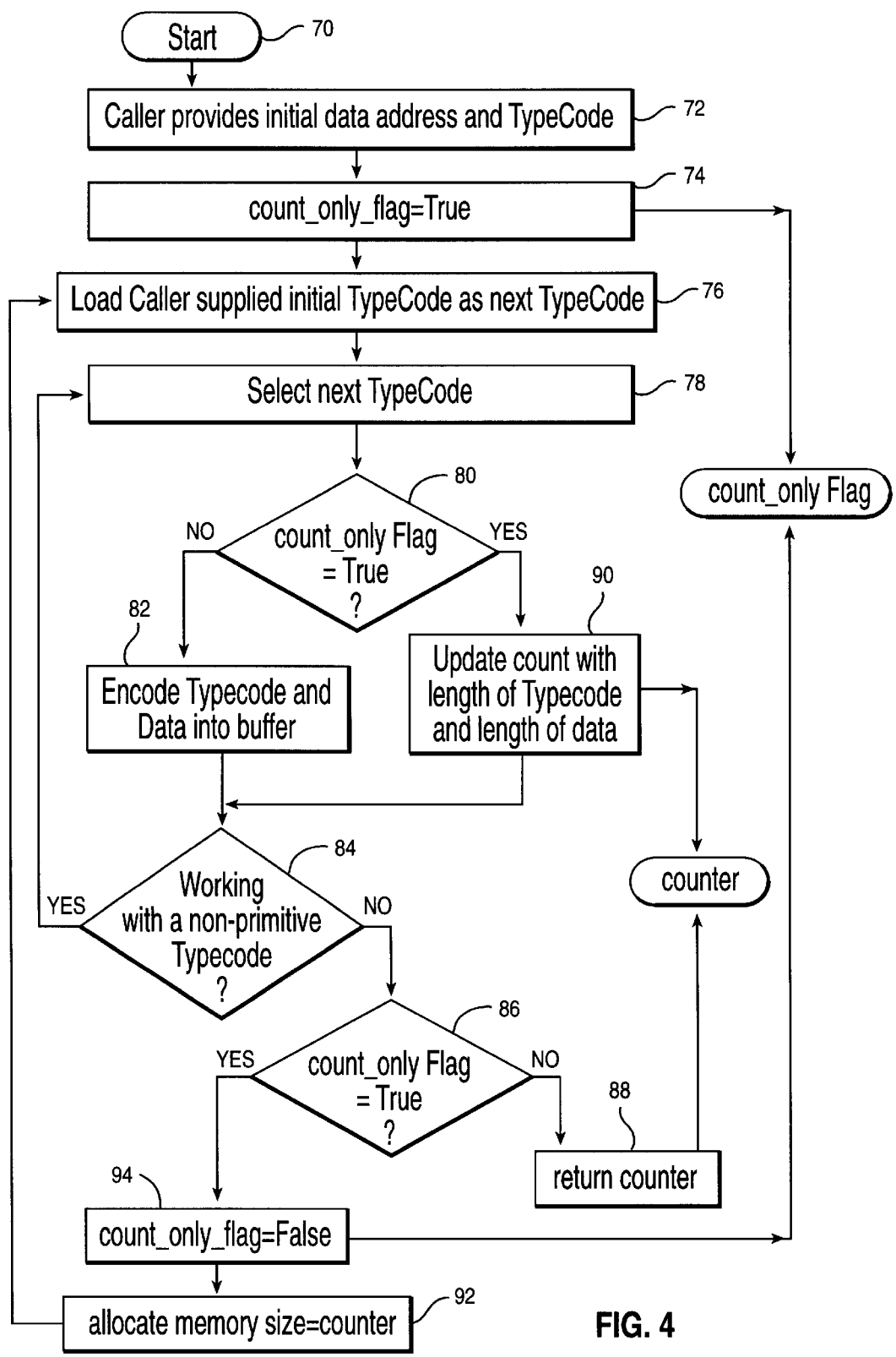
FIG. 4 is a flow diagram of the encoder routine used to decompose TypeCode data using the invention.

Referring now to FIG. 4, there is shown a flow diagram describing the operation of the tc_encode() routine. The procedure starts at block 70 and proceeds immediately to block 72 where the Caller provides an initial data address of a CORBA data type and a TypeCode. At block 74, the count_only_flag is set equal to True. The procedure then loads the caller supplied initial TypeCode as the next TypeCode as shown in block 76. At block 78, the procedure selects the next TypeCode and performs a check at block 80 to determine if the count_only_flag is equal to True. If YES, the procedure updates the count with the length of the TypeCode and length of the data as shown in block 90. If NO, processing continues at block 82 where the TypeCode and Data is encoded into the buffer. At block 84, a check is conducted to determine if the procedure is working within a non-primitive TypeCode. If YES, the procedure returns to block 78 to select the next TypeCode. If NO, processing continues at block 86 where the count_only_flag is checked to see if it is True. If YES, processing continues at block 94 where the count_only_flag is set equal to False, and the allocated memory size is set to equal the counter as shown in block 92. If NO, the counter is returned to the caller. The TDM thus encodes provided CORBA data types into a buffer using the two pass procedure described above. The TDM allocates the buffer and subsequently passes ownership to the caller. The two pass procedure operates over the entire supplied COBRA data type to decompose the arbitrarily complex CORBA data types in a flat data buffer representation that can be stored on a disk or database.

TABLE A

Internal Primitive Routines:

| | |
|---|---|
| + | encode_float(),decode_float() |
| + | encode_long(),decode_long() |
| + | encode_ulong(),decode_ulong() |
| + | encode_objref(),decode_objref() |
| + | encode_octet(),decode_octet() |
| + | encode_char(),decode_char() |
| + | encode_double(),decode_double() |
| + | encode_short(),decode_short() |
| + | encode_ushort(),decode_ushort() |
| + | encode_typecode(),decode_typecode() |
| + | encode_string(),decode string() |

Internal Aggregate Routines:

| | |
|---|---|
| + | encode_any(),decode_any() |
| + | encode_array(),decode_array() |
| + | encode_sequence(),decode_sequence() |
| + | encode_struct(),decode_struct() |
| + | encode_union(),decode_union() |

Figure 5:
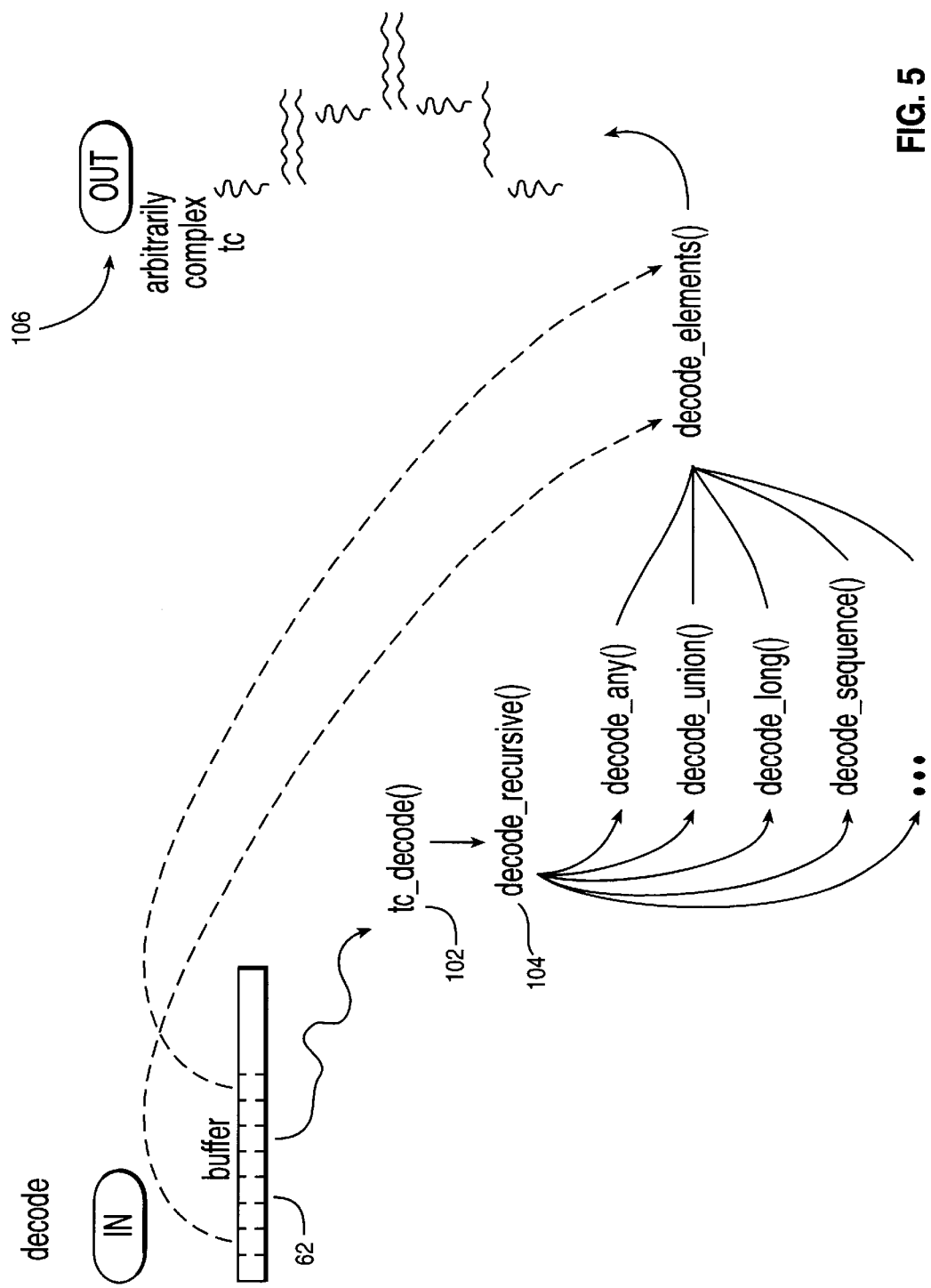
FIG. 5 is a pictorial representation of the TypeCodeData-Manipulator's decoder routine in accordance with the invention.

Referring now to FIG. 5, there is shown a tc_decode routine 102 in the TypeCodeDataManipulator (TDM) for reconstructing 106 an inputted stream buffer 62. The routine decodes (reconstructs) the inputted stream buffer 62, encoded by tc_encode routine, into a passed address (i.e., the location of a memory address which is supplied to the TDM). The TDM dynamically allocates the required memory to do the recursive decode 104, and passes ownership of the final reconstruction of the arbitrarily complex TypeCode 106 to the caller. This is accomplished, essentially by reversing the tc_encode() logic.

Figure 6:
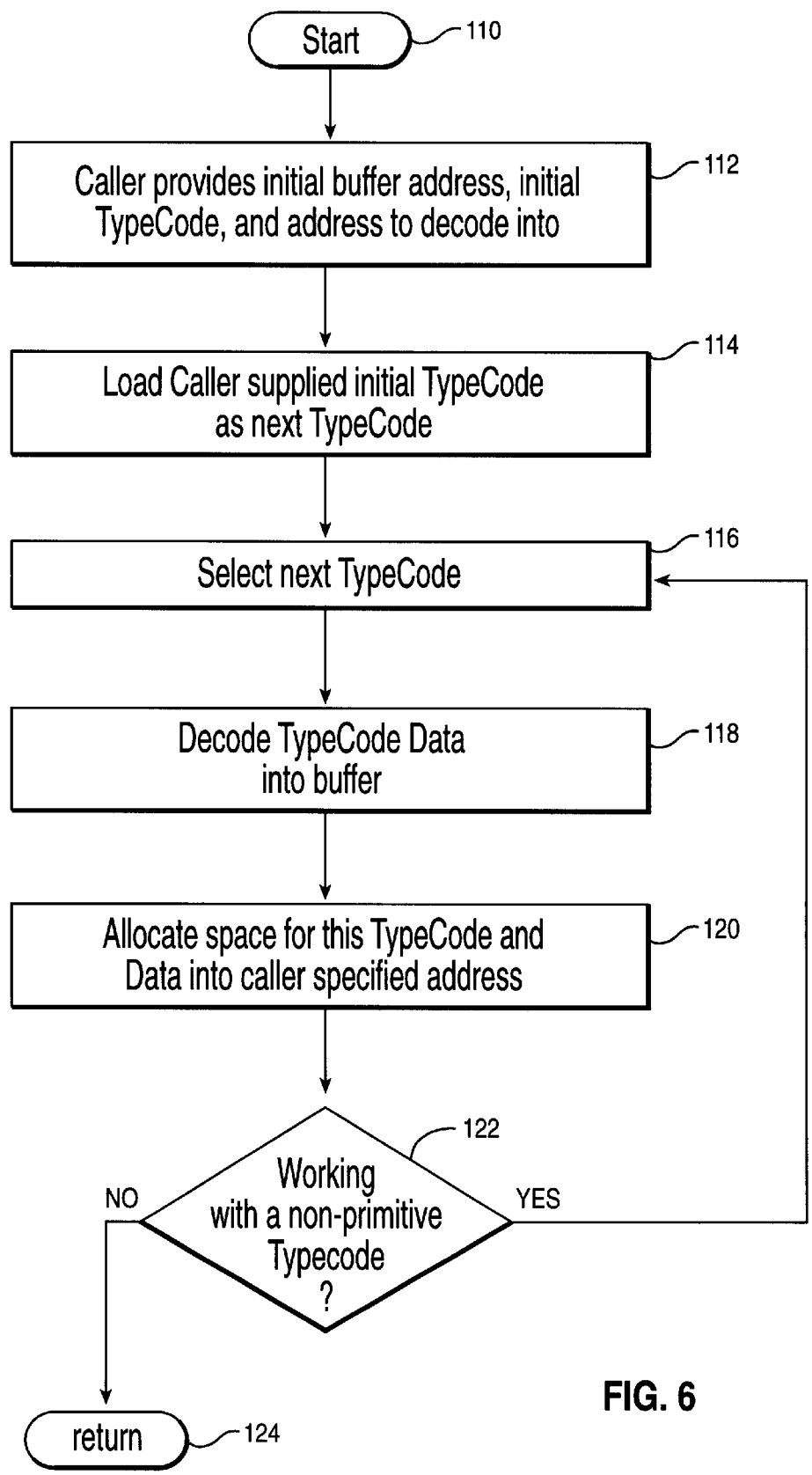
FIG. 6 is a flow diagram of the decoder routine shown in FIG. 5.

Referring now to FIG. 6, there is shown a flow diagram for reconstructing an inputted stream buffer using the tc_decode routine. The procedure starts at block 110 and proceeds immediately to block 112 where a caller provides an initial buffer address, an initial TypeCode, and an address into which to decode the data. At block 114, the procedure loads the caller supplied initial TypeCode as the next Type-Code and selects the next TypeCode as shown in block 116. The TypeCode data is then decoded into the buffer as shown in block 118. At block 120, the procedure allocates space for the TypeCode and Data at the caller specified address. A check is carried out at block 122 to determine if the procedure is working within a non-primitive TypeCode. If YES, the procedure returns to block 116 to select the next TypeCode. If NO, the procedure continues at block 124 by executing a return. The TDM thus decodes a provided stream buffer into an address supplied by the caller. As appreciated by one skilled in the art, reconstruction is essentially the reverse of Pass 2 of the tc_encode() routine.

TABLE B

```
interface testobj
{
    typedef struct simplestruct{
        string s;
        long I;
    } asimplestruct;
    typedef struct complexstruct {
        string outer_s;
        long outer_I;
        asimplestruct inner_simplestruct;
    } acomplexstruct;
};
```

Figure 7:
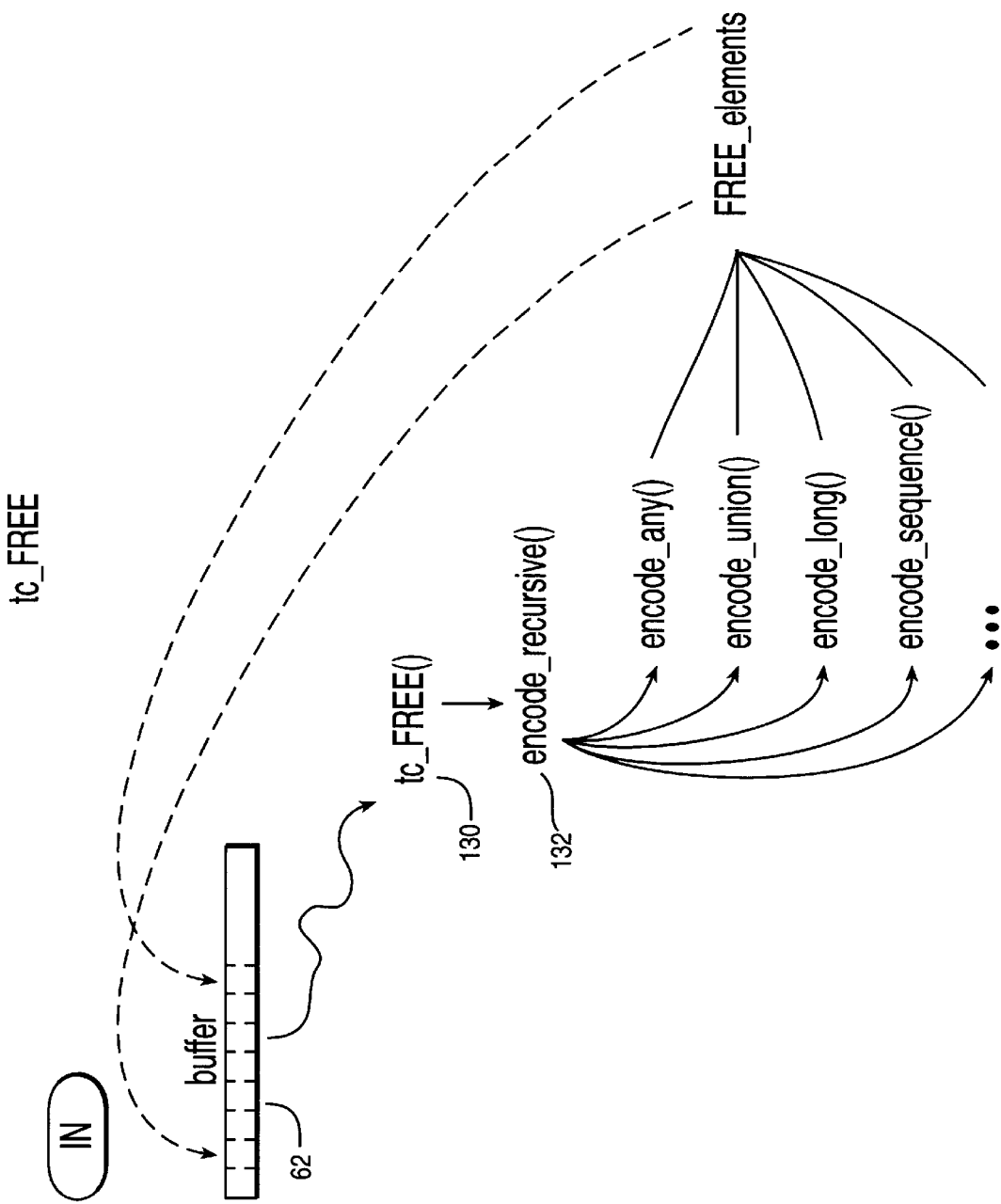
FIG. 7 is a pictorial representation of a routine used to free memory used in the operation of the encoder/decoder routines of the invention.

Referring now to FIG. 7, there is shown the TypeCodeDataManipulator's (TDM) tc_free() routine 130 which is used to free all memory allocated for element space within a passed encode buffer (deep free), and then frees the passed buffer 62 itself. This is accomplished by utilizing the same recursive logic flow in the encode_recursive routine 132 used in the tc_encode() 64 and tc_decode() 102 operations.

Figure 9:
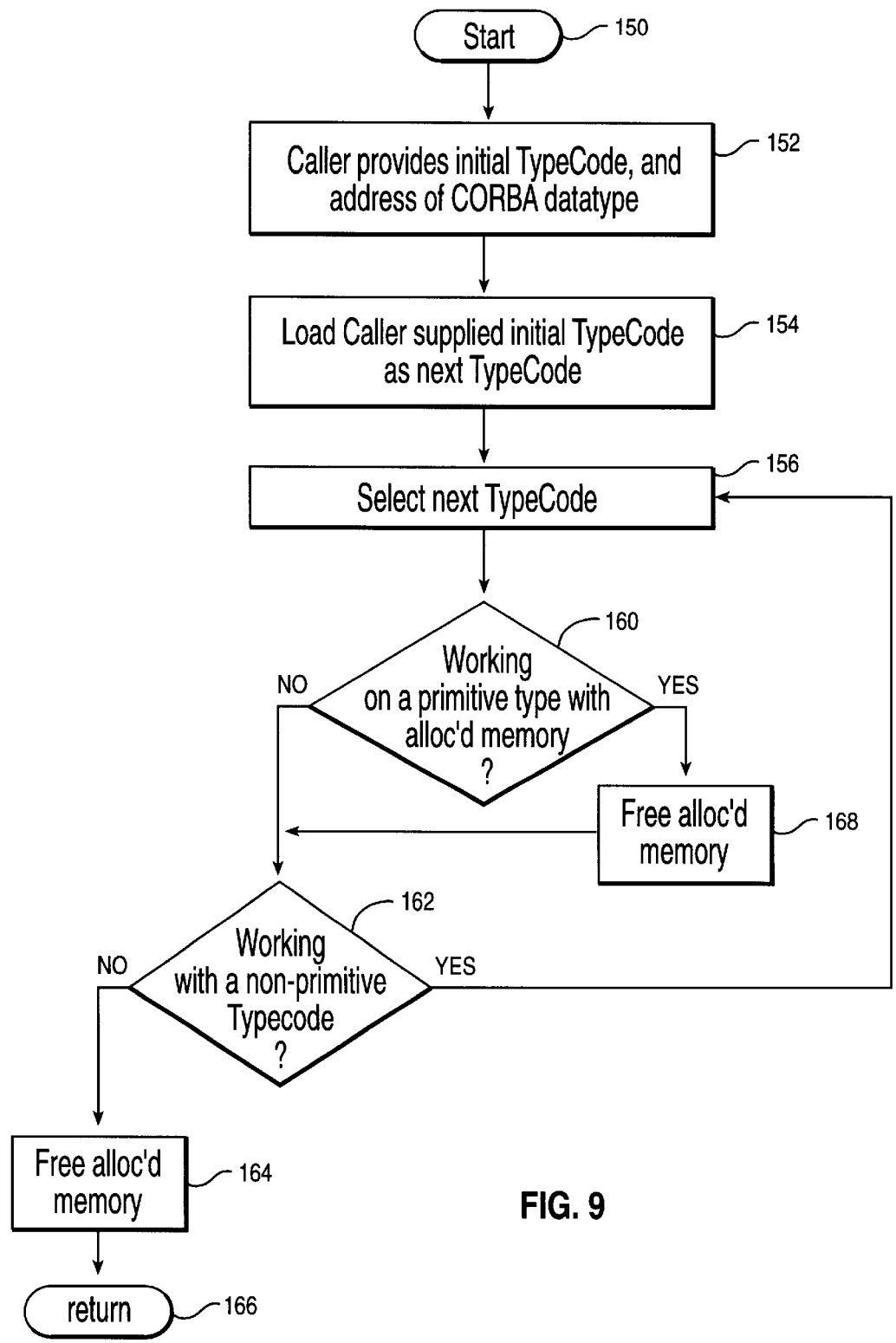
FIG. 9 is a flow diagram of the routine for freeing allocated memory used in the encoder/decoder routines of the invention.

Turning now to FIG. 9, there is shown a flow diagram used by the TDM to free all memory allocated for element space within a passed encode buffer (i.e., a deep free operation which consists of freeing memory for allocated complex types, such as structure members), and then frees the passed buffer itself. The procedure begins at block 150 and proceeds immediately to block 152 where the caller provides an initial TypeCode and an address of a CORBA data type. At block 154, the procedure loads the caller supplied initial TypeCode as the next TypeCode and selects the next TypeCode as shown at block 156. A check is performed at block 160 to determine if the procedure is working on a primitive type within allocated memory. If YES, processing continues at block 168 to free the allocated memory. Else, at block 162 the procedure determines if the procedure is working with a non-primitive TypeCode. If YES, processing returns to block 156 to select another TypeCode. If NO, at block 164 the procedure frees the allocated memory and executes a return at block 166.

Figure 8A:
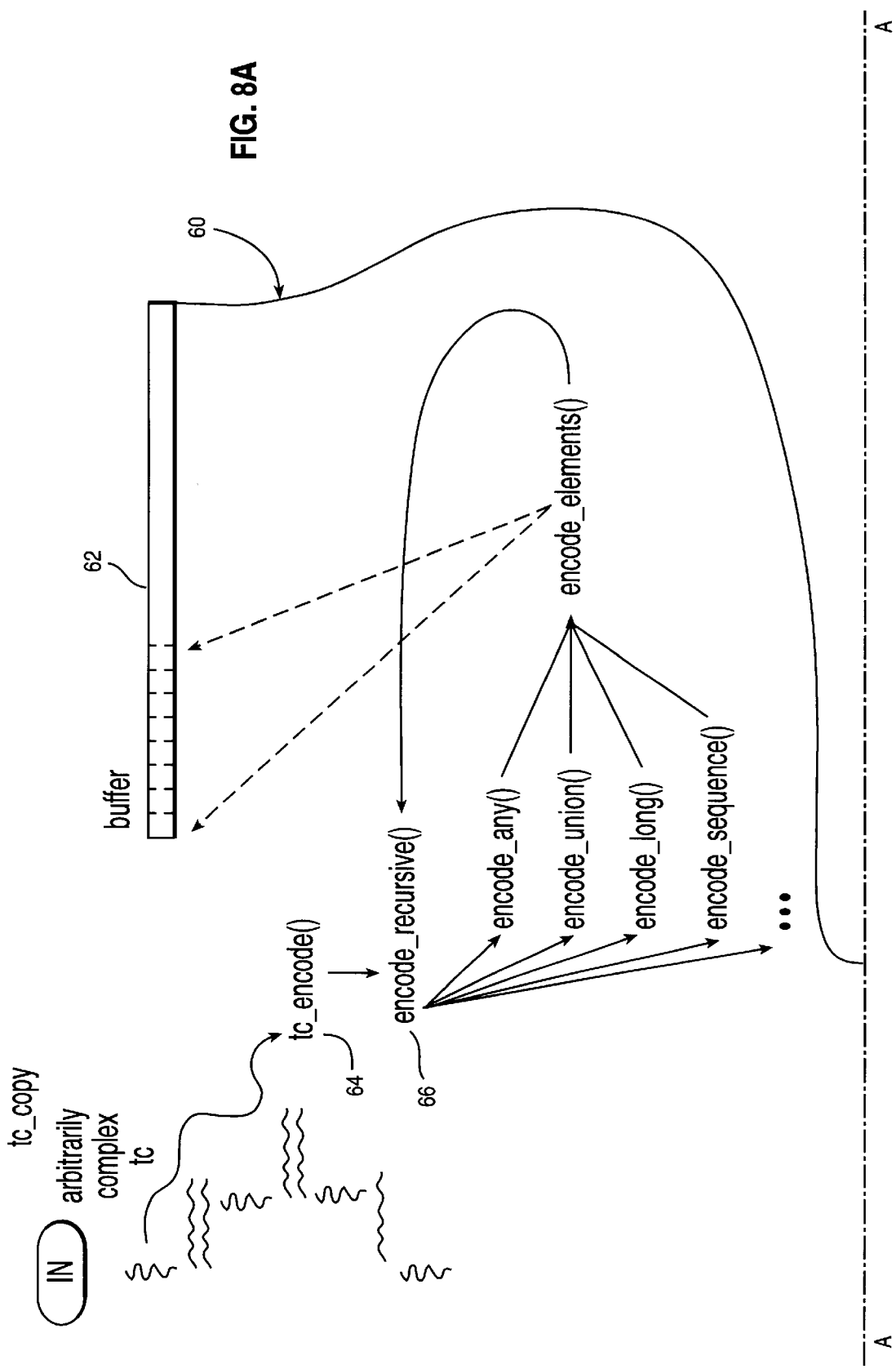
FIG. 8 is a pictorial representation of a routine used to make a copy of the arbitrarily complex data types of the invention.
Figure 8B:
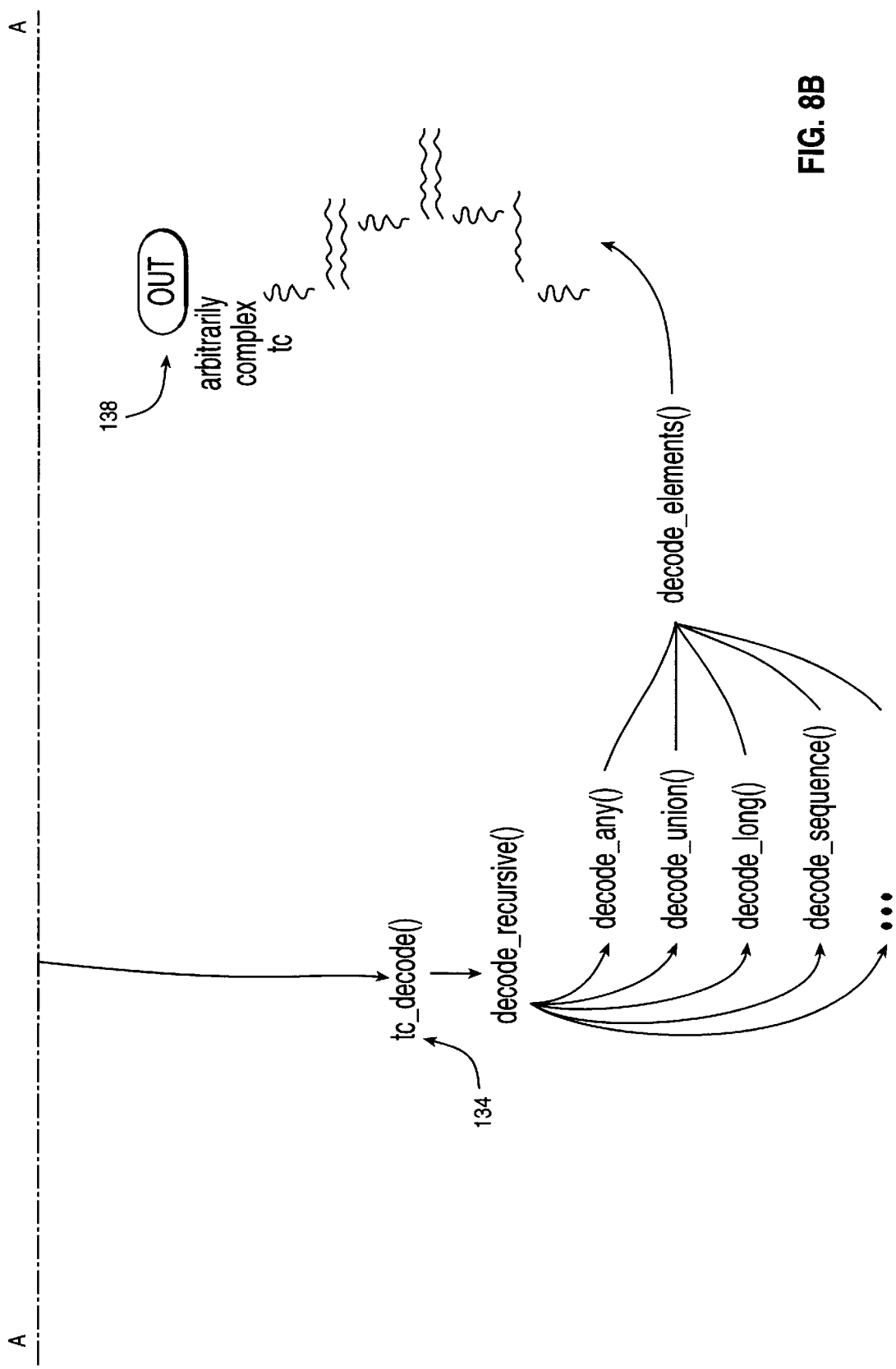

Referring now to FIG. 8, there is shown a pictorial of the tc_copy() routine of the TDM which is used to output 138 deep copies of CORBA data types. The TDM encodes, via the tc_encode() routine 64, the passed COBRA TypeCodes in buffer 62, and decodes them, via the tc_decode() 134 to produce a copy of the TypeCodes 138.

Figure 10:
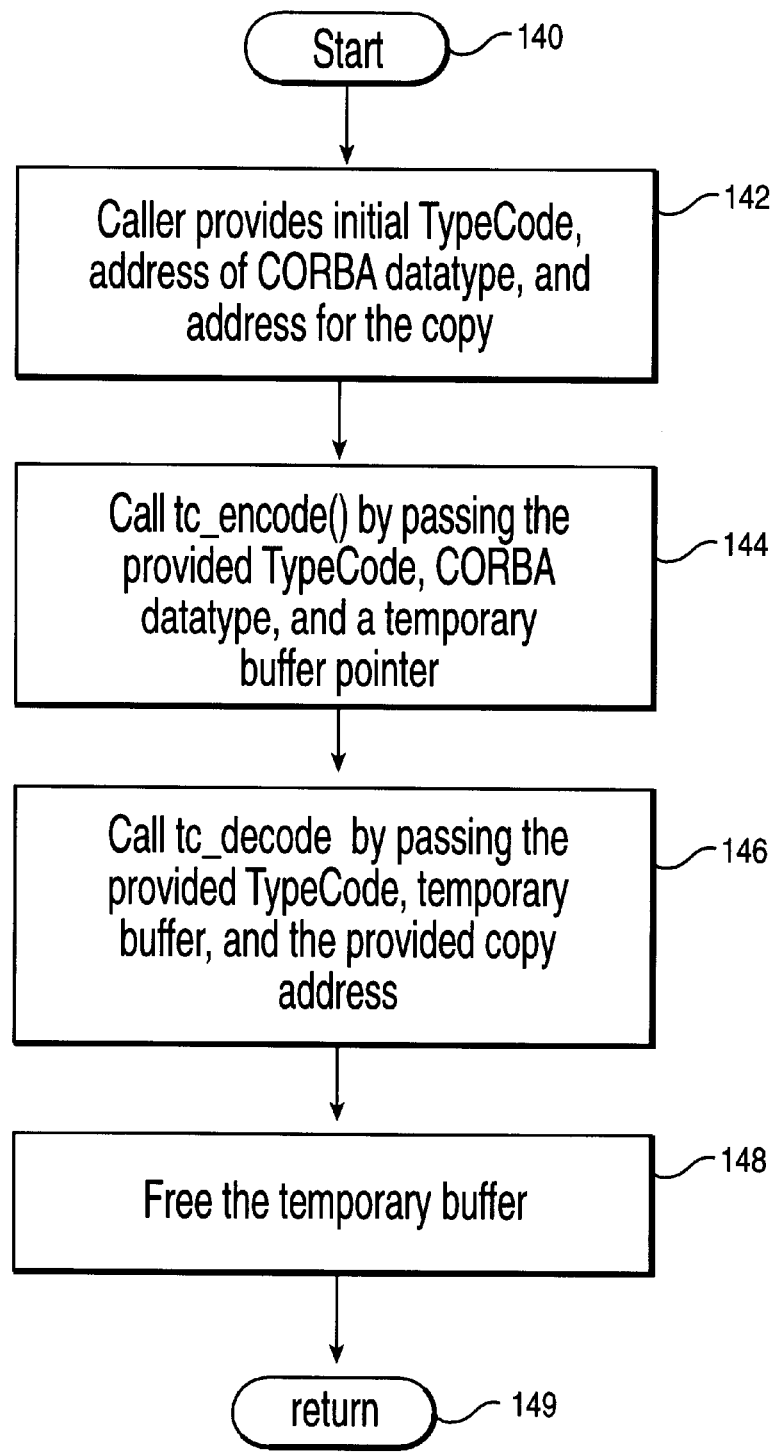
FIG. 10 is a flow diagram of the routine used to free the allocated memory used in the decomposition/reconstruction of arbitrarily complex data types of the invention.

Referring now to FIG. 10, there is shown a flow diagram for operation of the tc_copy() routine in the TDM. The procedure starts at block 140 and proceeds immediately to block 142 where the caller provides an initial TypeCode, an address of the CORBA data type, and an address for the copy. At block 144, the procedure calls the tc_encode() by passing the caller provided TypeCode, CORBA data type, and a pointer to a temporary buffer. The procedure then calls tc_decode by passing the provided TypeCode, temporary buffer, and the caller provided copy address as shown at block 146. At block 148, the procedure frees the temporary buffer and executes a return at block 149. The tc_copy operation in the TDM thus provides for "deep" copies of the CORBA data types via the above routine. As appreciated by those skilled in the art, a deep copy is a memory copy of the types themselves along with any memory allocated to represent complex types, such as structure members. It is essentially a convenience procedure that encodes (tc_encode()) the passed CORBA TypeCode, and decodes (tc_decode()) it into a copy.

Figure 11:
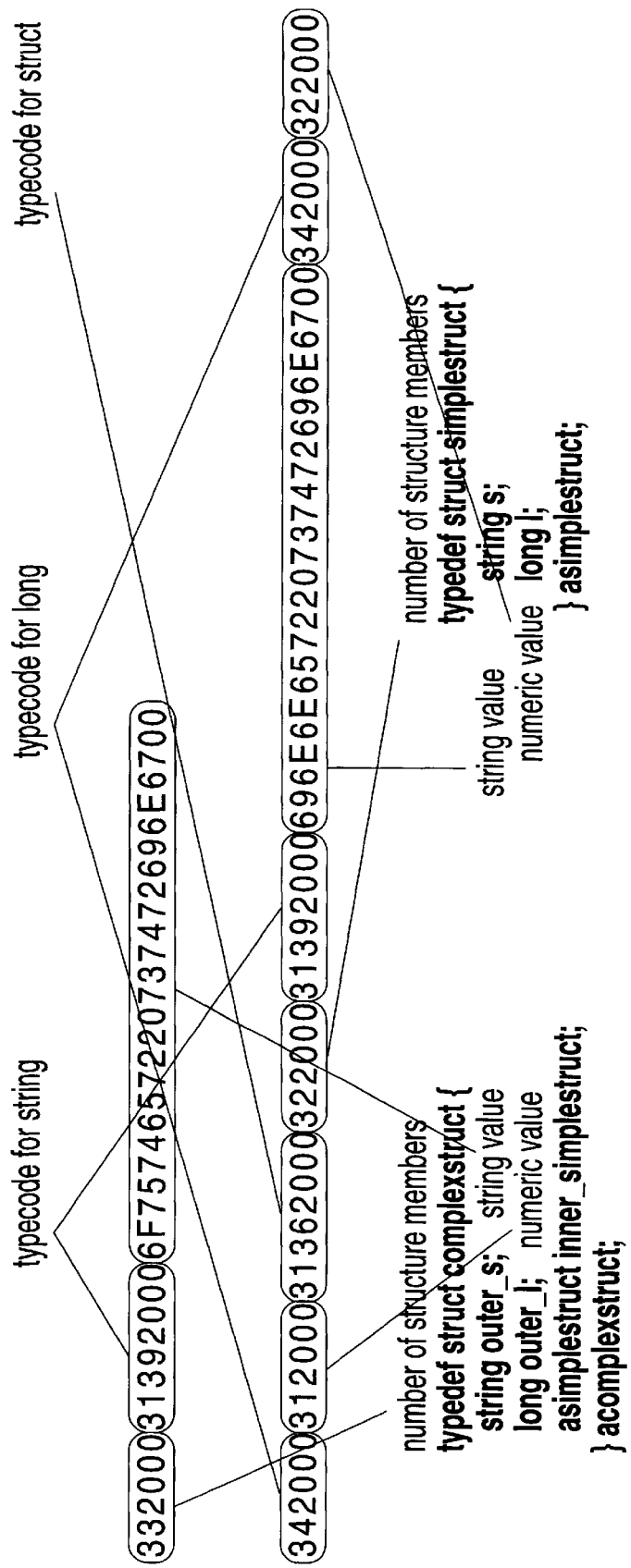
FIG. 11 is an example of the contents of a flat data buffer produced from inputting arbitrarily complex data types of the invention.

The TDM formats its data into an opaque (i.e., a black box or an object where the internal structure is encapsulated, and is known only by parts of a program that needs to know) data buffer. The internal format of the buffer is driven by the characteristics of the TypeCode being formatted. Formatting the CORBA types into a buffer is illustrated by the OMG Interface Definition Language (IDL) in TABLE B, which shows two primitives and another structure which contains itself and two primitives. The higher level structure (i.e., complexstruct) is passed to the TDM for encoding. The code fragments shown in TABLE C illustrates the invocation of the encode operation in the TDM, in order to convert the instantiated "complexstruct" structure, defined in the IDL into a flat representation of the data. Execution of the code shown in TABLE C results in an opaque buffer (i.e., tagged "buf" in TABLE C) with a length of 56 (i.e., returned to the called tagged 'size' in TABLE C), containing the data in hexadecimal format as shown in FIG. 11.

TABLE C

```
TypeCode tc;
char **ptr;
TypeCodeDataManipulator*tdm;
Environment ev;
void *buf;
unsigned long size;
struct testobj__complexstructmystruct;
struct testobj__complexstruct*mystructout;
tdm = TypeCodeDataManipulatorNew();
tc=TC__testobj__acomplexstruct;
mystruct.outer__I=1;
mystruct.outer__s=(char*)malloc(40);
strcpy(mystruct.outer__s,"outerstring"
mystruct.inner__simplestruct.I=2;
mystruct.inner__simplestruct.s=(char*)malloc(40);
strcpy(mystruct.inner__simplestruct.s"innerstring");
size=__tc__encode(tdm,&ev,tc,&mystruct,(void**)&buf);
//The following would be used to reconstruct the
original structure://
__tc__decode(tdm,&ev,tc,(void*)buf,size,(void**)
&mystructout);
```

While the invention has been described with respect to a preferred embodiment thereof, it will be understood by those skilled in the art that various changes in detail may be made therein without departing from the spirit, scope, and teaching of the invention. Accordingly, the herein disclosed invention is to be limited only as specified in the following claims.

What we claim is:

1. A method, implemented in a computer system, for decomposing a plurality of CORBA data type code elements in an object oriented environment, comprising the steps of:

providing said plurality of CORBA data type code elements from a caller in said object oriented environment as arbitrarily complex information;

examining recursively each of said plurality of CORBA data type code elements within said arbitrarily complex information;

maintaining a running total of a memory size for expressing said plurality of CORBA data type code elements in said arbitrarily complex information in a flat buffer in said object oriented environment;

converting said plurality of CORBA data type code elements represented by said arbitrarily complex information into a contiguous representation that is opaque to said caller in said flat buffer in said object oriented environments; and passing said flat buffer to said caller and releasing said flat buffer after the conversion of said CORBA data type code elements.

2. The method of claim 1, wherein the step of converting said plurality of CORBA data type code elements into a contiguous representation further comprises the step of:

processing each of said plurality of CORBA data type code elements within said arbitrarily complex information to determine the actual data for each of said plurality of CORBA data type code elements.

3. The method of claim 1, wherein the step of converting said plurality of CORBA data type code elements into a contiguous representation further comprises the step of:

processing each of said plurality of CORBA data type code elements in said arbitrarily complex information to determine the length information for each of said plurality of CORBA data type code elements.

4. The method of claim 1, wherein the step of converting said plurality of CORBA data type code elements into a contiguous representation further comprises the step of:

processing each of said plurality of CORBA data type code elements within said arbitrarily complex information to determine type information for each of said plurality of CORBA data type code elements.

5. The apparatus of claim 1, wherein the means for converting said plurality of CORBA data type code elements into a contiguous representation further comprises:

means for processing each of said plurality of CORBA data type code elements within said arbitrarily complex information to determine the actual data for each of said plurality of CORBA data type code elements.

6. The method as recited in claim 1 comprising:

reconstructing CORBA data type code elements in the flat data buffer by recursively processing the flat data buffer passed to said caller using a decode routine.

7. An apparatus for decomposing a plurality of CORBA data type code elements in an object oriented environment, comprising:

means for providing said plurality of CORBA data type-code elements from a caller in said object oriented environment as arbitrarily complex information;

means for examining recursively each of said plurality of CORBA data type code elements within said arbitrarily complex information;

means for maintaining a running total of a memory size for expressing said plurality of CORBA data type code elements in said arbitrarily complex information in a flat buffer in said object oriented environment;

means for converting said plurality of CORBA data type code elements represented by said arbitrarily complex information into a contiguous representation that is opaque to said caller in said flat buffer in said object oriented environment; and means for passing said flat buffer to said caller and releasing said flat buffer after the conversion of said CORBA data type code elements.

8. The apparatus of claim 7, wherein the means for converting said plurality of CORBA data type code elements into a contiguous representation Further comprises:

means for processing each of said plurality of CORBA data type code elements in said arbitrarily complex information to determine the length information for each of said plurality of CORBA data type code elements.

9. The apparatus of claim 7, wherein the means for converting said plurality of CORBA data type code elements into a contiguous representation further comprises:

means for processing each of said plurality of CORBA data type code elements within said arbitrarily complex information to determine type information for each of said plurality of CORBA data type code elements.

10. The apparatus as recited in claim 7 comprising:

means for reconstructing CORBA data type code elements in the flat data buffer by recursively processing the flat data buffer passed to said caller using a decode routine.

11. A computer program product having a computer readable medium having computer program Logic recorded thereon for decomposing a plurality of CORBA data type code elements in an object oriented environment, comprising:

computer readable means for providing said plurality of CORBA data type code elements from a caller in said object oriented environment as arbitrarily complex information;

computer readable means for examining recursively each of said plurality of CORBA data type code elements within said arbitrarily complex information;

computer readable means for maintaining a running total of a memory size for expressing said plurality of CORBA data type code elements in said arbitrarily complex information in a flat buffer in said object oriented environment;

computer readable means for converting said plurality of CORBA data type code elements represented by said arbitrarily complex information into a contiguous representation in said flat buffer in said object oriented environment; and computer readable means for passing said flat buffer to said caller and releasing said flat buffer after the conversion of said CORBA data type code elements.

12. The computer program of claim 11, further comprising:

computer readable means for processing each of said plurality of CORBA data type code elements within said arbitrarily complex information to determine the actual data for each of said plurality of CORBA data type code elements.

13. The computer program of claim 11, further comprising:

computer readable means for processing each of said plurality of CORBA data type code elements in said arbitrarily complex information to determine the length information for each of said plurality of CORBA data type code elements.

14. The computer program of claim 11, further comprising:

computer readable means for processing each of said plurality of CORBA data type code elements within said arbitrarily complex information to determine type information for each of said plurality of CORBA data type code elements.

15. A computer program product having a computer readable medium having computer program logic recorded thereon as recited in claim 11 comprising:

computer readable means for reconstructing said converted CORBA data type code elements in said flat data buffer by recursively processing the flat data buffer passed to said caller using a decode routine.

* * * * *